US011426817B2

(12) United States Patent
Riggs et al.

(10) Patent No.: US 11,426,817 B2
(45) Date of Patent: Aug. 30, 2022

(54) LOCK AND FAIL-SAFE FOR LASER WELDING LENS

(71) Applicant: Toyota Motor Engineering & Manufacturing North America, Inc., Plano, TX (US)

(72) Inventors: Adrian C. Riggs, Kitchener (CA); Cole H. Renton, Whitby (CA); Bradley A. Cormier, Kitchener (CA)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 354 days.

(21) Appl. No.: 16/583,892

(22) Filed: Sep. 26, 2019

(65) Prior Publication Data

US 2021/0094122 A1   Apr. 1, 2021

(51) Int. Cl.
*B23K 26/21* (2014.01)
*B23K 26/70* (2014.01)
*B23K 26/06* (2014.01)

(52) U.S. Cl.
CPC .......... *B23K 26/21* (2015.10); *B23K 26/0648* (2013.01); *B23K 26/707* (2015.10)

(58) Field of Classification Search
CPC ... B23K 26/21; B23K 26/707; B23K 26/0648
USPC ....................................... 219/121.13, 121.68
See application file for complete search history.

(56) References Cited

U.S. PATENT DOCUMENTS

| | | | |
|---|---|---|---|
| 5,737,346 A | 4/1998 | Stenstrom | |
| 6,016,230 A * | 1/2000 | Nunnally | G02B 7/004 359/819 |
| 6,714,366 B2 | 3/2004 | Wisecarver et al. | |
| 6,881,924 B2 * | 4/2005 | Lai | B23K 26/10 219/121.67 |
| 8,198,566 B2 * | 6/2012 | Baird | B23K 26/0624 219/121.69 |
| 8,394,344 B2 | 3/2013 | Schutt et al. | |
| 8,952,292 B2 * | 2/2015 | Behmlander | B23K 9/1735 219/136 |
| 2010/0072180 A1 * | 3/2010 | Schuermann | B23K 26/38 219/121.67 |
| 2011/0024402 A1 * | 2/2011 | Hozumi | B23K 26/21 219/121.64 |
| 2014/0014634 A1 * | 1/2014 | Liu | B23K 26/361 219/121.68 |

(Continued)

*Primary Examiner* — Jimmy Chou
(74) *Attorney, Agent, or Firm* — Christopher G. Darrow; Darrow Mustafa PC

(57) ABSTRACT

A locking and fail-safe system can ensure proper installation of a lens assembly in a laser welding machine. The laser welding machine includes a laser head, a lens assembly, and an alignment tab operatively connected to the lens assembly. A device can be operatively positioned relative to the laser welding machine. The device can include a spring pin member with a movable slide pin. In a locked condition, the spring pin member can be positioned such that the slide pin is received in an aperture in the alignment tab, indicating that the lens assembly is properly installed and locking the lens assembly in place. A sensor can be used to determine whether the spring pin assembly is in a correct position, location, and/or orientation. The laser welding machine can be disabled if the spring pin member is not in a correct position, location, and/or orientation.

10 Claims, 4 Drawing Sheets

(56) References Cited

U.S. PATENT DOCUMENTS

| | | | |
|---|---|---|---|
| 2015/0041443 A1* | 2/2015 | Darzi .................... | B23K 1/0056 |
| | | | 219/121.13 |
| 2016/0158888 A1* | 6/2016 | Liu ....................... | B23K 26/361 |
| | | | 219/121.68 |
| 2016/0288267 A1* | 10/2016 | Gesuita ................. | B23K 26/707 |
| 2019/0221985 A1* | 7/2019 | Tamura ................ | B23K 26/0608 |

* cited by examiner

LOCK AND FAIL-SAFE FOR LASER WELDING LENS

FIELD

The subject matter described herein relates in general to laser welding and, more particularly, to the installation of components of a laser welding machine.

BACKGROUND

Laser welding is a process used to join structures using a laser. Laser welding is used in high volume manufacturing processes, such as in the automotive industry. Some laser welding machines may include a refractive lens. The refractive lens can prevent laser beams reflecting off a work area from entering back into the laser welding machine.

SUMMARY

In one respect, the present disclosure is directed to a locking and fail-safe system. The system includes a laser welding machine and a locking and fail-safe device operatively positioned relative to the laser welding machine. The laser welding machine includes a laser head, a lens assembly, and an alignment tab operatively connected to the lens assembly. An aperture can be defined in the alignment tab. The locking and fail-safe device can include a bracket and a spring pin member operatively connected to the bracket. The spring pin member can be rotatable about an axis of rotation. The spring pin member can include a slide pin movable between an extended position and a retracted position. The slide pin can be biased into the extended position. In a locked condition, the slide pin can be received in the aperture in the alignment tab. In such condition, the lens assembly can be prevented from being removed from the laser welding machine. In an unlocked condition, the slide pin is not received in the aperture in the alignment tab. As a result, the lens assembly may be removed from the laser welding machine.

DETAILED DESCRIPTION

Figure 2:
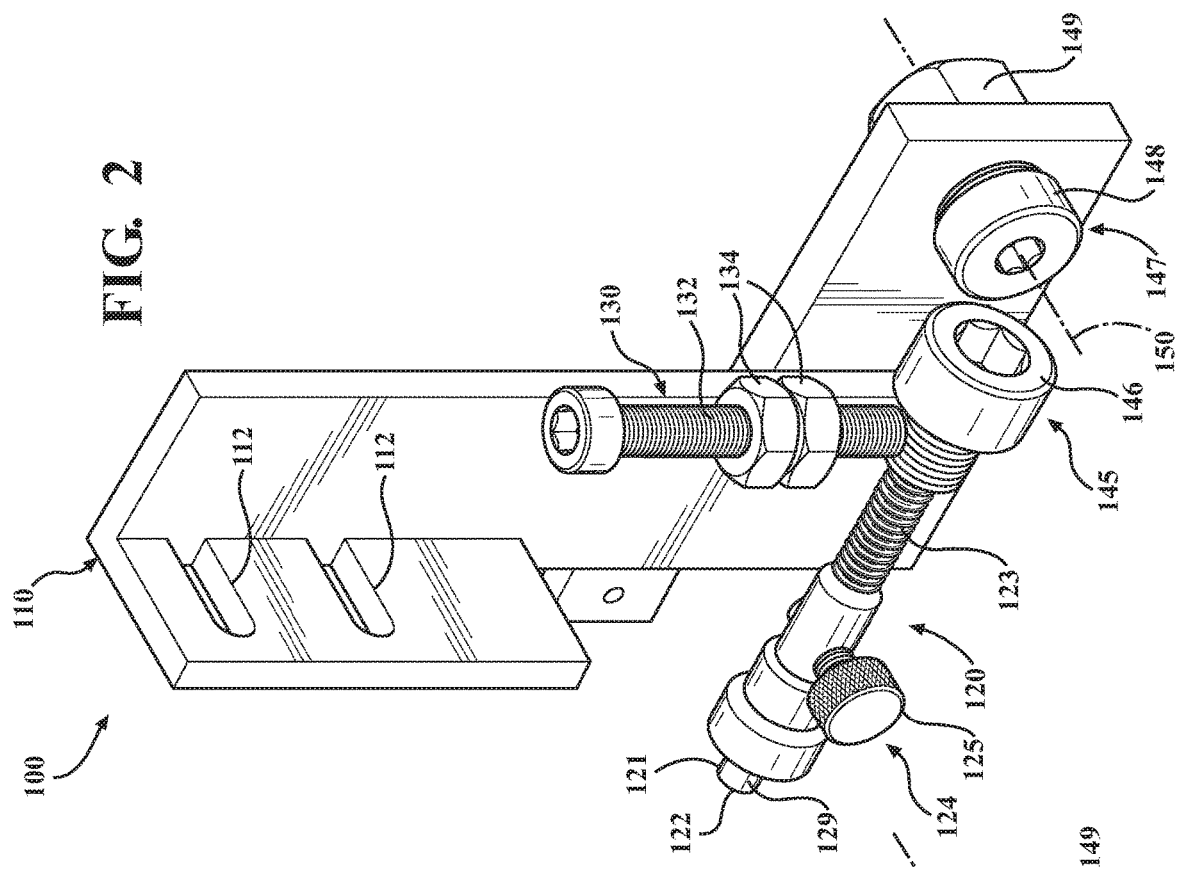
FIG. 2 is an example of the lock and fail-safe device, showing some of the components removed.

Refractive lenses of a laser welding machine should be cleaned frequently, such as one or more times daily. Due to repeated cleaning, the refractive lens is frequently removed from and re-installed on the laser welding machine. The refractive lens must be properly installed prior to actually operating laser welding machine. If the refractive lens is not properly aligned, the refractive lens can come loose during laser welding. Significant equipment damage can occur, leading to costly repairs and machine downtime.

Accordingly, arrangements described herein are directed to ensuring the proper installation of a lens assembly in a laser welding machine. The laser welding machine can include a laser head and a lens assembly. An alignment tab can be operatively connected to the lens assembly. An aperture can be defined in the alignment tab. A lock and fail-safe device can be operatively positioned relative to the laser welding machine. The lock and fail-safe device can include a spring pin member with a movable slide pin. In a locked condition, the spring pin member can be positioned such that the slide pin is received in an aperture in the alignment tab. The locked position can be an indicator that the lens assembly is properly installed and can lock the lens assembly in place. In some arrangements, one or more sensors can acquire position data about the spring pin member. Such data can be used to determine whether the spring pin assembly is in a correct position, location, and/or orientation. The laser welding machine can be disabled if the spring pin member is not in a correct position, location, and/or orientation. Arrangements described herein can help to ensure that the lens assembly is properly installed and minimize the risk of the lens assembly from coming out of place while the laser welding machine is in operation.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Figure 1:
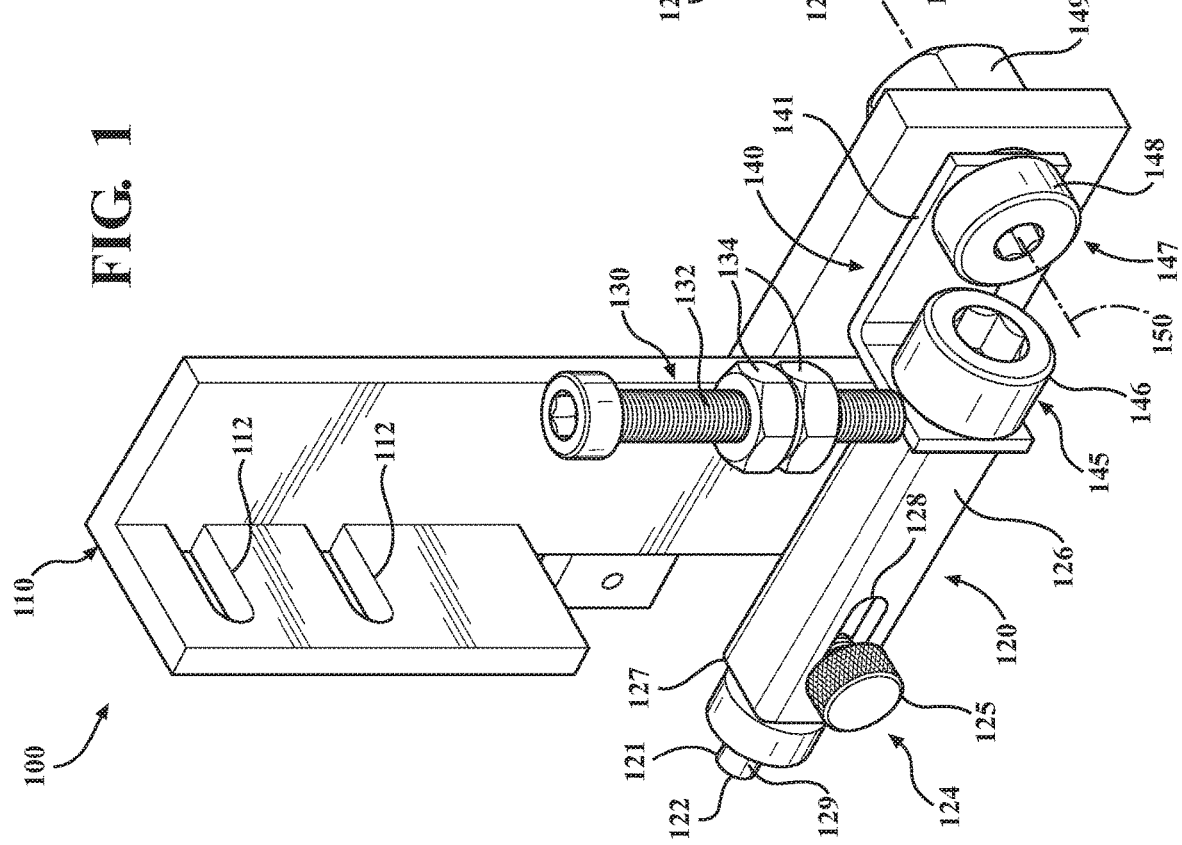
FIG. 1 is an example of a lock and fail-safe device.

Referring to FIGS. 1-2, an example of a lock and fail-safe device 100 is shown. FIG. 2 shows some of the components of the lock and fail-safe device 100 removed so that other components and/or aspects of the lock and fail-safe device 100 are visible. The lock and fail-safe device 100 can include a bracket 110 and a spring pin member 120.

The bracket 110 can have any suitable size, shape, and/or configuration. The configuration of the bracket 110 shown in FIGS. 1-2 is merely one example. The bracket 110 can be configured to be operatively connected to a portion of a laser welding machine or some other structure. For instance, the bracket 110 can include one or more apertures 112 to allow passage of a fastener for operative connection to the laser welding machine or some other structure. The bracket 110 can be made of any suitable material, such as metal or plastic.

The spring pin member 120 can include a slide pin 121. The slide pin 121 can have a distal end 122. In some arrangements, the distal end 122 can be tapered, rounded, or flat. The slide pin 121 can have any suitable shape. In one or more arrangements, the slide pin 121 can be substantially cylindrical.

The slide pin 121 can be movable between an extended position and a retracted position. The slide pin 121 can be biased into an extended position via one or more biasing members (e.g., one or more springs 123 (see FIG. 2)). In some arrangements, the spring pin member 120 can include and end cap 129. The end cap 129 can be operatively connected to the slide pin 121.

The spring pin member 120 can include a user interface element 124. The user interface element 124 can enable a user to selectively manipulate the slide pin 121 into the extended position or the retracted position. The user interface element 124 can be operatively connected to the slide pin 121. In one or more arrangements, the user interface element 124 can be a thumb screw 125. However, it will be appreciated that the user interface element 124 can have other forms.

At least a portion of the slide pin 121 can be enclosed in a housing 126. The housing 126 can include a slot 128 to allow movement of the user interface element 124 within the slot 128 when a user manually manipulates the slide pin 121. An end 127 of the housing 126 can be open or include an aperture to allow the slide pin 121 to move into and out of the housing 126. The open end 127 or the aperture in the end 127 and/or the end cap 129 can be sized such that the end cap 129 is larger than the open end 127 or the aperture in the end 127. Thus, the end cap 129 can establish a maximum retracted position for the slide pin 121.

The spring pin member 120 can be operatively connected to the bracket 110 in any suitable manner. The spring pin member 120 can be operatively connected to the bracket 110 via a connecting member 140. In one or more arrangements, the connecting member 140 can be a connecting bracket 141. The connecting bracket 141 can be made of any suitable material, such as metal. In one or more arrangements, the connecting bracket 141 can be substantially L-shaped. The spring pin member 120 can be operatively connected to the connecting member 140 in any suitable manner, such as by one or more fasteners 145. In one or more arrangements, the fastener(s) 145 can be a hex cap screw 146.

The connecting member 140 can also be operatively connected to the bracket 110. The connecting member 140 can be operatively connected to the bracket 110 in any suitable manner, such as by one or more fasteners 147. In one or more arrangements, the spring pin member 120 can be pivotably connected to the bracket 110. For instance, the connection between the connecting member 140 and the bracket 110 can allow for pivoting movement of the connecting member 140 about an axis of rotation 150. Thus, the spring pin member 120 can be rotatable about the axis of rotation 150. In one or more arrangements, the one or more fasteners 147 can be shoulder screws 148, which can engage a hex nut 149. In one or more arrangements, the axis of rotation 150 can extend substantially horizontally when the lock and fail-safe device 100 is installed in its operational position.

In some arrangements, the rotational movement of the spring pin member 120 can be limited. In one or more arrangements, the lock and fail-safe device 100 can include an anti-rotation member 130. The anti-rotation member 130 can create any desired limitation on the rotational movement of the spring pin member 120. In one or more arrangements, the anti-rotation member 130 can prevent the spring pin member 120 at least from rotating clockwise beyond a substantially horizontal position (e.g., the position shown in FIG. 1). In certain conditions, the anti-rotation member 130 can engage any portion of the spring pin member 120 and/or component to which the spring pin member 120 is operatively connected (e.g., the connecting bracket 141) to prevent rotational movement.

The anti-rotation member 130 can be any structure for physically impeding the rotational movement of the spring pin member 120. The anti-rotation member 130 can have any suitable configuration. One example of the anti-rotation member 130 is shown in FIGS. 1-2. In this example, the anti-rotation member 130 can be defined by a bolt 132 operatively connected to the bracket 110. In this example, the bolt 132 can be held in place by one or more nuts 134 or other threaded members, which can be welded or otherwise connected to the bracket 110. In some arrangements, the position of the bolt 132 can be adjustment by turning the bolt 132 within the nut(s) 134.

The anti-rotation member 130 can extend at substantially 90 degrees relative to the spring pin member 120 when the spring pin member 120 is in the position shown in FIGS. 1-2. In some arrangements, the anti-rotation member 130 can extend in a substantially vertical direction when the lock and fail-safe device 100 is installed in its operational position.

Now that the individual components of the lock and fail-safe device 100 have been described, an example of the use lock and fail-safe device 100 in a portion 300 of a system will now be described with respect to FIGS. 3-4. Other possible elements of the system are shown in connection with FIG. 5.

The lock and fail-safe device 100 can be operatively positioned relative to a laser welding machine 310. In some arrangements, the lock and fail-safe device 100 can be operatively connected to the laser welding machine 310. As an example, the bracket 110 can be operatively connected to the laser welding machine 310 in any suitable manner, such as by one or more bolts 305. In some arrangements, one or more modifications can be made to the laser welding machine 310 to facilitate operative connection with the bracket 110. For instance, one or more threaded holes can be formed in a portion of the laser welding machine 310. It should be noted that, in the arrangements shown in FIGS. 3-4, the lock and fail-safe device 100 does not include the anti-rotation member 130.

The laser welding machine 310 can be any type of laser welding machine, now known or later developed. The laser welding machine 310 can have a laser head 320, which includes the operative laser components of the laser welding machine 310. The laser welding machine 310 can include one or more removable components. For instance, the removable component can be a lens assembly 330. The lens assembly 330 can be installed in the laser head 320 and/or the laser welding machine 310 in any suitable manner. The lens assembly 330 can include a lens and a housing 332. In one or more arrangements, the lens can be a refractive lens. However, it will be appreciated that the lens can be any type of lens that may be used in connection with a laser welding machine.

One or more sensors 340 can be operatively connected to the lock and fail-safe device 100. For instance, the sensor(s) 340 can be operatively connected to the bracket 110, such as by one or more fasteners, one or more adhesives, one or more forms of mechanical engagement, just to name a few possibilities. The sensor(s) 340 can be operatively positioned to acquire position data about the spring pin member 120. In one or more arrangements, the sensor(s) 340 can be located directly above a portion of the spring pin member 120.

"Sensor" means any device, component and/or system that can detect, determine, assess, monitor, measure, quantify and/or sense something. According to arrangements herein, the sensor(s) 340 can be configured to detect, directly or indirectly, information or data about whether the lens assembly 330 is correctly installed on the laser welding machine 310. For instance, the sensor(s) 340 can be configured to acquire position data of the spring pin member 120. "Position data" means the location data, position data, orientation data, or any combination thereof, of the spring pin member 120. As an example, the sensor(s) 340 can be configured to measure a distance between the spring pin member 120 and the sensor(s) 340. In one or more arrangements, the sensor(s) 340 can detect a single location of the spring pin member 120, or the sensor(s) 340 can detect a plurality of locations of the spring pin member 120.

The sensor(s) 340 can be any suitable type of sensor. In one or more arrangements, the sensor(s) 340 can include one or more cameras, one or more laser-based sensors, one or more proximity sensors, and/or one or more ranging sensors. In one or more arrangements, the sensor(s) 340 can be E3Z-LS distance-settable photoelectric sensors available from Omron Automation, Kyoto, Japan. In one or more arrangements, the sensor(s) 340 can be configured to transmit outbound laser signals downwardly toward the spring pin member 120. The signals can reflect off of the spring pin member 120 and can be received as return signals by the sensor(s) 340.

Arrangements described herein can be configured to ensure that the lens assembly 330 is properly installed in the laser welding machine 310. To that end, an alignment tab 350 can be operatively connected to the lens assembly 330.

The alignment tab 350 can have any suitable size, shape, and/or configuration. In one or more arrangements, the alignment tab 350 can be substantially rectangular. The alignment tab 350 can be a block of material, such as metal or plastic. An aperture 352 can be defined in an end 354 of the alignment tab 350. The aperture 352 can be sized to receive a portion of the slide pin 121 of the spring pin member 120.

The alignment tab 350 can be made in any suitable manner, such as by machining, casting, etc. The alignment tab 350 can be operatively connected to the lens assembly 330 in any suitable manner. For instance, the alignment tab 350 can be operatively connected to the lens assembly 330 via one or more fasteners 356.

Figure 3:
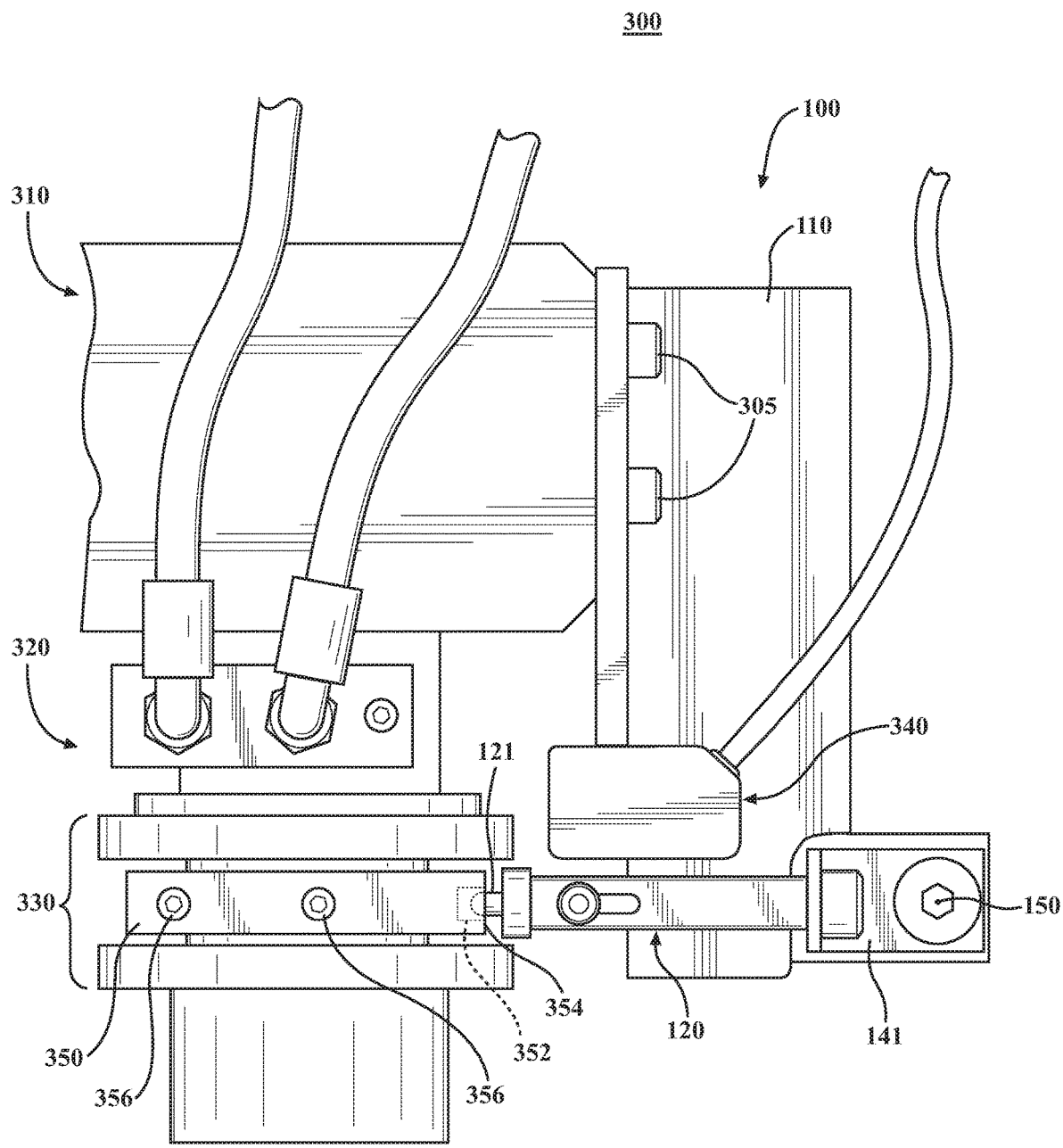
FIG. 3 is an example of a portion of a lock and fail-safe system, showing a locked condition.
Figure 4:
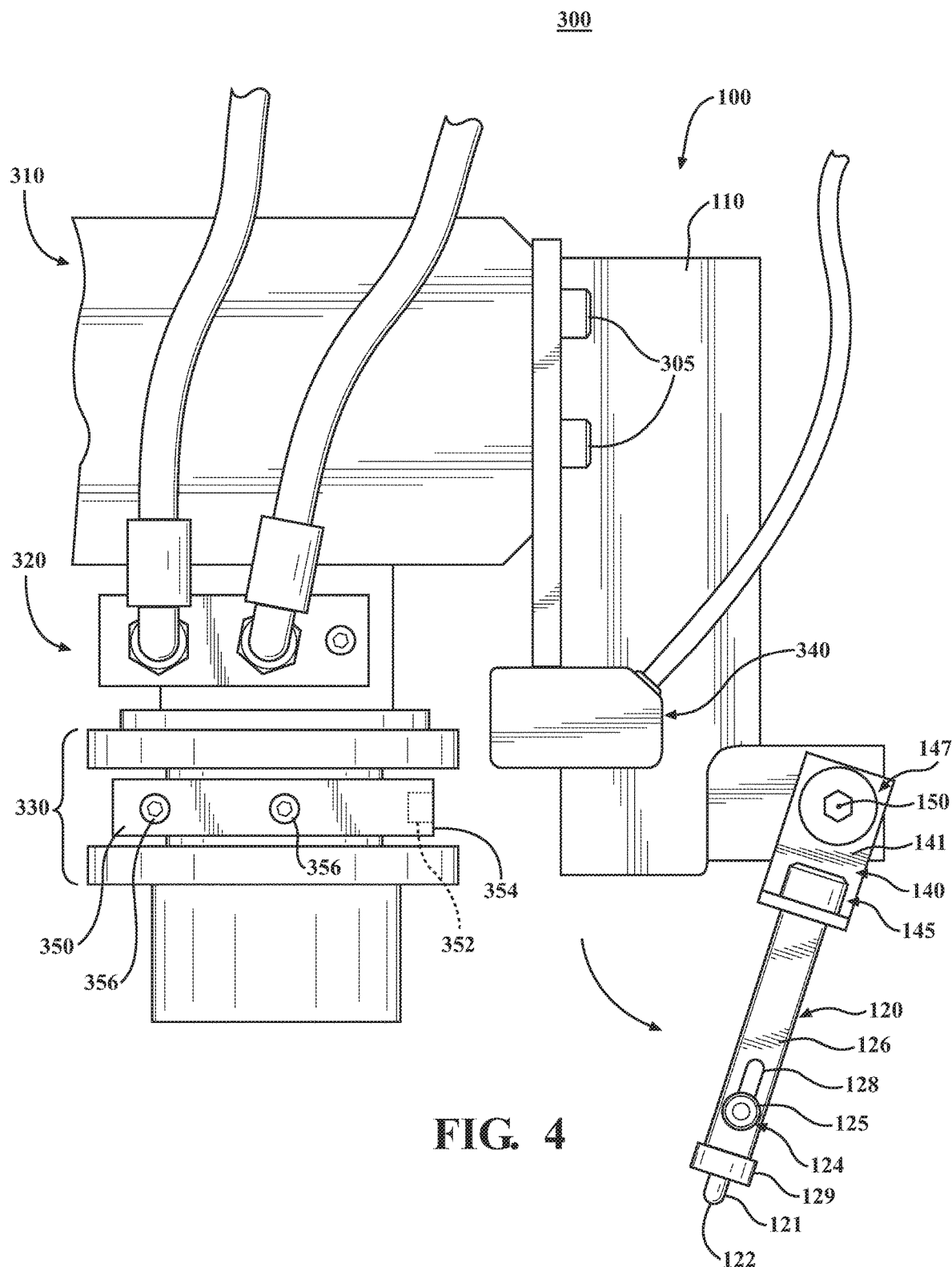
FIG. 4 is an example of the portion of the lock and fail-safe system, showing an unlocked condition.

FIGS. 3-4 show two operational conditions between the lock and fail-safe device 100 and the laser welding machine 310. FIG. 3 shows an example of a locked condition. In the locked configuration, the slide pin 121 of the spring pin member 120 is in an extended position. The slide pin 121 is received in the aperture 352 in the alignment tab 350. As a result, a visual confirmation is provided that the lens assembly 330 is correctly installed. Also, the engagement of the slide pin 121 in the aperture 352 can ensure that the lens assembly 330 remains locked in place while the laser welding machine 310 is in use. When in the locked position, the spring pin member 120 can extend in a substantially horizontal direction as shown in FIG. 3.

FIG. 4 shows an example of an unlocked condition. In the unlocked condition, the slide pin 121 of the spring pin member 120 is not received in the aperture 352. As a result, the spring pin member 120 can be free to rotate about the axis of rotation 150. In this case, the spring pin member 120 can rotate downwardly under the influence of gravity and/or by manual manipulation. It will be appreciated that the slide pin 121 cannot be inserted into the aperture 352 in the alignment tab 350 unless the lens assembly 330 is completely and/or properly installed. If the lens assembly 330 is not properly installed, the aperture 352 in the alignment tab 350 will be misaligned with any position of the slide pin 121.

Figure 5:
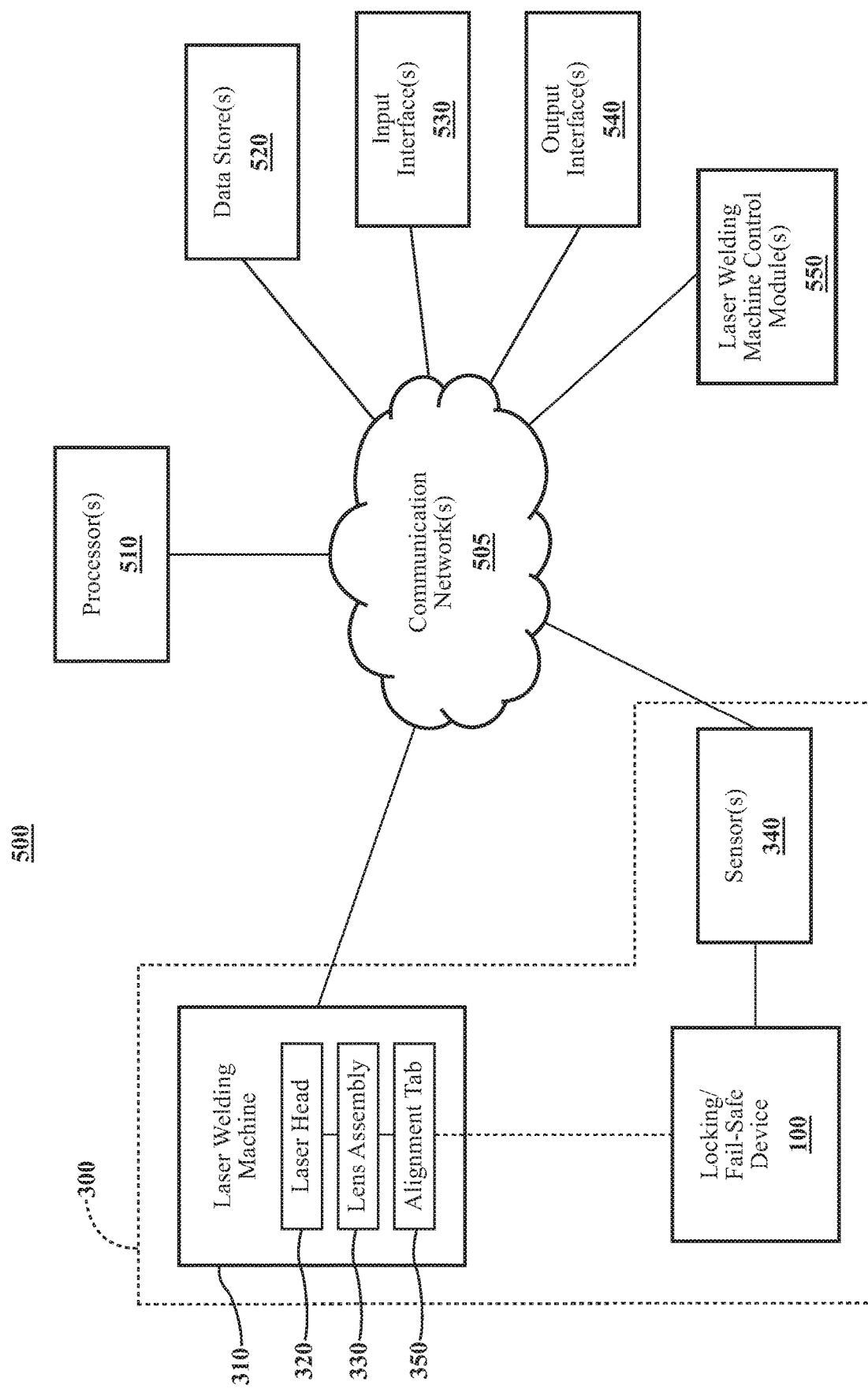
FIG. 5 is an example of the lock and fail-safe system.

Referring to FIG. 5, an example of a system 500 is shown. The system 500 can include various elements. Some of the possible elements of the system 500 are shown in FIG. 5 and will now be described. However, it will be understood that it is not necessary for the system 500 to have all of the elements shown in FIG. 5 or described herein. The system 500 can have any combination of the various elements shown in FIG. 5. Further, the system 500 can have additional elements to those shown in FIG. 5. In some arrangements, the system 500 may not include one or more of the elements shown in FIG. 5.

The system 500 can include the lock and fail-safe device 100 and the laser welding machine 310, as described above in connection with FIGS. 3-4. The above discussion of these elements applies equally here.

The system 500 can include one or more processors 510, one or more data stores 520, one or more sensors 340, one or more input interfaces 530, one or more output interfaces 540, and/or one or more laser welding machine control modules 550. Each of these elements will be described in turn below.

The various elements of the system 500 can be communicatively linked to one another or one or more other elements through one or more communication networks 505. As used herein, the term "communicatively linked" can include direct or indirect connections through a communication channel, bus, pathway or another component or system. A "communication network" means one or more components designed to transmit and/or receive information from one source to another. The data store(s) 520 and/or one or more other elements of the system 500 can include and/or execute suitable communication software, which enables the various elements to communicate with each other through the communication network and perform the functions disclosed herein.

The one or more communication networks 505 can be implemented as, or include, without limitation, a wide area network (WAN), a local area network (LAN), the Public Switched Telephone Network (PSTN), a wireless network, a mobile network, a Virtual Private Network (VPN), the Internet, a hardwired communication bus, and/or one or more intranets. The communication network 505 further can be implemented as or include one or more wireless networks, whether short range (e.g., a local wireless network built using a Bluetooth or one of the IEEE 802 wireless communication protocols, e.g., 802.11a/b/g/i, 802.15, 802.16, 802.20, Wi-Fi Protected Access (WPA), or WPA2) or long range (e.g., a mobile, cellular, and/or satellite-based wireless network; GSM, TDMA, CDMA, WCDMA networks or the like). The communication network can include wired communication links and/or wireless communication links. The communication network can include any combination of the above networks and/or other types of networks.

The system 500 can include one or more processors 510. "Processor" means any component or group of components that are configured to execute any of the processes described herein or any form of instructions to carry out such processes or cause such processes to be performed. The processor(s) 510 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 510 can include at least one hardware circuit (e.g., an integrated circuit) configured to carry out instructions contained in program code. In arrangements in which there is a plurality of processors 510, such processors can work independently from each other or one or more processors can work in combination with each other.

The system 500 can include one or more data stores 520 for storing one or more types of data. The data store(s) 520 can include volatile and/or non-volatile memory. Examples of suitable data stores 520 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 520 can be a component of the processor(s) 510, or the data store(s) 520 can be operatively connected to the processor(s) 510 for use thereby.

The data store(s) 520 can store any suitable data or information in any form, now known or later developed. For instance, the data store(s) 520 can store information about any of the elements of the system 500.

In one or more arrangements, the data store(s) 520 can store data relating to the laser welding machine 310. For instance, the data store(s) 520 can store thresholds, profiles, settings, and/or preferences. More particularly, the data store(s) 520 can store information or data about positions, locations, and/or orientations of the spring pin member 120 indicative of being properly installed and/or improperly installed. In one or more arrangements, the data store(s) 520 can store data acquired by one or more elements of the system 500, such as the sensors(s) 340.

The system 500 can include one or more input interfaces 530. An "input interface" includes any device, component, system, element or arrangement or groups thereof that enable information/data to be entered into a machine. The input interface(s) 530 can receive an input from a user (e.g., a person) or other entity. Any suitable input interface(s) 530 can be used, including, for example, a keypad, display, touch screen, multi-touch screen, button, joystick, mouse, trackball, microphone, gesture recognition (radar, lidar, camera, or ultrasound-based), and/or combinations thereof.

The system 500 can include one or more output interfaces 540. An "output interface" includes any device, component, system, element or arrangement or groups thereof that enable information/data to be presented to a user (e.g., a person) or other entity. The output interface(s) 540 can present information/data to a user or other entity. The output interface(s) 540 can include a display, an earphone, haptic device, and/or speaker. Some components of the system 500 may serve as both a component of the input interface(s) 530 and a component of the output interface(s) 540.

The system 500 can include one or more modules. The modules can be implemented as computer readable program code that, when executed by a processor, implement one or more of the various processes described herein. One or more of the modules can be a component of the processor(s) 510, or one or more of the modules can be executed on and/or distributed among other processing systems to which the processor(s) 510 is operatively connected. The modules can include instructions (e.g., program logic) executable by one or more processor(s) 510. Alternatively or in addition, one or more data stores 520 may contain such instructions. The modules described herein can include artificial or computational intelligence elements, e.g., neural network, fuzzy logic or other machine learning algorithms. Further, the modules can be distributed among a plurality of modules.

The system 500 can include one or more laser welding machine control modules 550. The laser welding machine control module(s) 550 can include profiles and logic for actively controlling the laser welding machine 310. More particularly, the laser welding machine control module(s) 550 can include profiles and logic for selectively enabling or disabling the laser welding machine 310. The laser welding machine control module(s) 550 can be configured to send control signals to the laser welding machine 310.

The laser welding machine control module(s) 550 can be configured to determine when the laser welding machine 310 should be enabled or disabled. The laser welding machine control module(s) 550 can be configured to do so in any suitable manner. For instance, the laser welding machine control module(s) 550 can be configured to enable or disable the laser welding machine 310 in response to detecting certain conditions or situations. These conditions or situations may relate to the position, location, and/or orientation of the spring pin member 120. The laser welding machine control module(s) 550 can be configured to detect these conditions or situations by analyzing data or information acquired by the sensor(s) 340, such as position data about the spring pin member 120.

The laser welding machine control module(s) 550 can use profiles, parameters, and/or settings loaded into the laser welding machine control module(s) 550 and/or stored in the data store(s) 520. Based on data or information acquired by the sensor(s) 340 and the profiles, parameters, and/or settings, the laser welding machine control module(s) 550 can determine whether the spring pin member 120 is in a proper location, position, and/or orientation. For instance, the laser welding machine control module(s) 550 can compare acquired position data of the spring pin member 120 to one or more acceptable position, location, and/or orientation thresholds.

If the spring pin member 120 is determined to be in an acceptable location, position, and/or orientation, the laser welding machine control module(s) 550 can cause the laser welding machine 310 to be activated or enabled. If the spring pin member 120 is determined as not being in the proper location, position, and/or orientation, the laser welding machine control module(s) 550 can cause the laser welding machine 310 to be deactivated or disabled. Thus, the laser welding machine 310 is prevented from operating, thereby providing a fail-safe. As used herein, "cause" or "causing" means to make, force, compel, direct, command, instruct, and/or enable an event or action to occur or at least be in a state where such event or action may occur, either in a direct or indirect manner.

In addition to activating or deactivating the laser welding machine 310, the laser welding machine control module(s) 550 can be configured to alert a user when the lens assembly 330 is not properly installed. For instance, the laser welding machine control module(s) 550 can cause a warning to be presented to a user, such as on the output interface(s) 540.

A non-limiting example of the operation of the arrangements described herein will now be presented in connection to FIGS. 3-4. For purposes of this example, the system will begin in the unlocked condition as shown in FIG. 4.

A user can manually manipulate the spring pin member 120. For instance, the user can rotate the spring pin member 120 clockwise about the axis of rotation 150. The user can manually manipulate the slide pin 121 into the retracted position via the thumb screw 125. When the slide pin 121 is substantially aligned with the aperture 352 in the alignment tab 350, the user can release the thumb screw 125 causing the slide pin 121 to move into the extended position under the bias of the spring(s) 123. When the slide pin 121 is received in the aperture 352, the system is in a locked condition.

It will be appreciated that the size, position, and arrangements of these components can permit the slide pin 121 to be received in the aperture 352 only if the lens assembly 330 is properly installed. If the lens assembly 330 is not properly installed, then the slide pin 121 will not extend into the aperture 352. As a result, the spring pin member 120 can rotate downwardly due to gravity. If the lens assembly 330 is not properly installed, then the slide pin 121 will be received in the aperture 352, as is shown in FIG. 3.

When the slide pin 121 is received in the aperture 352, an indicator is provided to the user confirming that the lens assembly 330 is property installed. Further, it will be appreciated that the lens assembly 330 can be locked in place. Thus, the lens assembly 330 can no longer be removed from the laser welding machine 310.

The sensor(s) 340 can acquire position data of the spring pin member 120. Based on the acquired data or information, it can be determined whether the spring pin member 120 is in an acceptable position, location, and/or orientation. If it is determined that the spring pin member 120 is not in an acceptable position, location, and/or orientation, then the laser welding machine control module(s) 550 can prevent the laser welding machine 310 from operating. The laser welding machine control module(s) 550 can cause an error message to be presented to a user, such as via the output interface(s) 540, to notify the user of the incorrect installation of the lens assembly 330.

If it is determined that the spring pin member 120 is in an acceptable position, location, and/or orientation, then the laser welding machine control module(s) 550 can activate or enable the laser welding machine 310. Thus, a user is allowed to operate the laser welding machine 310 to perform whatever work is at hand.

When work is completed and/or if the lens assembly 330 needs to be removed (e.g., for cleaning), a user can manually pull the slide pin 121 into the retracted position via the thumb screw 125. As a result, the slide pin 121 retracts out of the aperture 352. Once the slide pin 121 is outside of the aperture, the user can release the thumb screw 125 and the spring pin member 120, allowing the spring pin member 120 to rotate counterclockwise due to gravity. The system is in an unlocked condition, and the lens assembly 330 can be removed from the laser welding machine 310.

It will be appreciated that arrangements described herein can provide numerous benefits, including one or more of the benefits mentioned herein. For example, arrangements described herein can provide a quick and reliable indicator that a lens assembly is correctly installed in a laser welding machine. Arrangements described herein can prevent a laser welding machine from operating if the lens assembly is not properly installed. Arrangements described herein can help to further lock a properly installed refraction lens assembly in place. Arrangements described herein can prevent major breakdowns that could otherwise be caused by the lens assembly coming out of place. As a result, arrangements described herein can result in appreciable cost savings and down time avoidance.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The term "or" is intended to mean an inclusive "or" rather than an exclusive "or." The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC). The term "operatively connected," as used herein, can include direct or indirect connections, including connections without direct physical contact. As used herein, the term "substantially" or "about" includes exactly the term it modifies and slight variations therefrom. Thus, the term "substantially parallel" means exactly parallel and slight variations therefrom. "Slight variations therefrom" can include within 15 degrees/percent/units or less, within 14 degrees/percent/units or less, within 13 degrees/percent/units or less, within 12 degrees/percent/units or less, within 11 degrees/percent/units or less, within 10 degrees/percent/units or less, within 9 degrees/percent/units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degree/percent/unit or less. In some instances, "substantially" can include being within normal manufacturing tolerances.

Aspects herein can be embodied in other forms without departing from the spirit or essential attributes thereof. Accordingly, reference should be made to the following claims, rather than to the foregoing specification, as indicating the scope of the invention.

What is claimed is:

1. A system comprising:
    a laser welding machine, the laser welding machine including:
        a laser head;
        a lens assembly; and
        an alignment tab operatively connected to the lens assembly, the alignment tab including an aperture; and
    a locking and fail-safe device operatively positioned relative to the laser welding machine, the locking and fail-safe device including:
        a bracket; and
        a spring pin member operatively connected to the bracket, the spring pin member being rotatable about an axis of rotation, the spring pin member including a slide pin movable between an extended position and a retracted position, the slide pin being biased into the extended position by one or more biasing members,
    wherein, in a locked condition, the slide pin is received in the aperture in the alignment tab, whereby the lens assembly is not removable from the laser welding machine, and
    wherein, in an unlocked position, the slide pin is not received in the aperture in the alignment tab, whereby the lens assembly is removable from the laser welding machine.

2. The system of claim 1, wherein the bracket is directly connected to the laser welding machine.

3. The system of claim 1, wherein the one or more biasing members include one or more springs.

4. The system of claim 1, further including one or more sensors operatively connected to the bracket, the one or more sensors being configured to acquire position data of the spring pin member.

5. The system of claim 4, wherein the one or more sensors are laser-based proximity sensors.

6. The system of claim 4, further including one or more processors operatively connected to the one or more sensors, wherein the one or more processors are configured to selectively activate or deactivate the laser welding machine based on sensor data acquired by the one or more sensors.

7. The system of claim 6, wherein the one or more processors are configured to:
    compare acquired position data of the spring pin member to one or more thresholds; and
    when the acquired position data does not meet the one or more thresholds, causing the laser welding machine to be disabled.

8. The system of claim 7, wherein the one or more processors are further configured to:
    when the acquired position data of the spring pin member does not meet the one or more thresholds, cause an alert to be presented to a user on an output interface.

9. The system of claim 7, wherein the one or more processors are further configured to:
    when the acquired position data of the spring pin member meets the one or more thresholds, causing the laser welding machine to be enabled.

10. The system of claim 1, wherein the locking and fail-safe device further includes an anti-rotation member, and wherein the anti-rotation member is configured to limit rotational movement of the spring pin member about the axis of rotation.

* * * * *